US011526548B1

(12) United States Patent
Raman (10) Patent No.: US 11,526,548 B1
(45) Date of Patent: Dec. 13, 2022

(54) IMAGE-BASED QUERY LANGUAGE SYSTEM FOR PERFORMING DATABASE OPERATIONS ON IMAGES AND VIDEOS

(71) Applicant: Bank of America Corporation, Charlotte, NC (US)

(72) Inventor: Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/357,641

(22) Filed: Jun. 24, 2021

(51) Int. Cl.
| | |
|---|---|
| *G06F 16/30* | (2019.01) |
| *G06F 16/732* | (2019.01) |
| *G06F 16/783* | (2019.01) |
| *G06F 16/75* | (2019.01) |
| *G06F 16/2452* | (2019.01) |
| *G06V 40/16* | (2022.01) |

(52) U.S. Cl.
CPC .... *G06F 16/7335* (2019.01); *G06F 16/24522* (2019.01); *G06F 16/7343* (2019.01); *G06F 16/75* (2019.01); *G06F 16/784* (2019.01); *G06V 40/173* (2022.01)

(58) Field of Classification Search
CPC .............. G06F 16/7335; G06F 16/784; G06F 16/7343; G06F 16/24522; G06F 16/75; G06V 40/173
See application file for complete search history.

(56) References Cited

U.S. PATENT DOCUMENTS

| | | | |
|---|---|---|---|
| 5,842,191 A | 11/1998 | Stearns | |
| 9,659,185 B2 | 5/2017 | Elovici et al. | |
| 10,262,236 B2 | 4/2019 | Lim et al. | |
| 2004/0131254 A1 | 7/2004 | Liang et al. | |
| 2004/0179720 A1* | 9/2004 | Chen | G06V 40/16 707/E17.023 |
| 2007/0011711 A1 | 1/2007 | Wolf et al. | |
| 2011/0317009 A1 | 12/2011 | Kumaraswamy et al. | |
| 2013/0163960 A1* | 6/2013 | Abecassis | H04N 9/8227 386/244 |
| 2014/0250457 A1 | 9/2014 | Ramaswamy | |

(Continued)

OTHER PUBLICATIONS

Article entitled "A Natural Language-Based Interface for Querying a Video Database", by Kucuktunc et al., dated 2007. (Year: 2007).*

(Continued)

*Primary Examiner* — Mahesh H Dwivedi (57) ABSTRACT

A user device transmit a natural language query with a request for a description of videos stored in a media repository. A query system receives the query and determines a command associated with obtaining the requested description of the videos stored in the media repository requested by the query. The determined command corresponds to an image analysis to perform on at least a portion of the stored videos. The query system determines, based at least in part on the determined command, an artificial intelligence model to execute on at least the portion of the stored videos. The query system determines, by executing the determined artificial intelligence model, a model output that includes the requested description of the videos stored in the media repository. The query system provides a response to the query. The response includes the requested description of the videos stored in the media repository.

17 Claims, 4 Drawing Sheets

(56) References Cited

U.S. PATENT DOCUMENTS

| | | |
|---|---|---|
| 2015/0256835 A1 | 9/2015 | Sakai |
| 2015/0319506 A1* | 11/2015 | Kansara .......... H04N 21/43079 |
| | | 725/32 |
| 2016/0004914 A1 | 1/2016 | Park |
| 2016/0019426 A1 | 1/2016 | Tusch et al. |
| 2016/0154882 A1* | 6/2016 | Cheng .................... G06F 16/73 |
| | | 707/758 |
| 2017/0185829 A1 | 6/2017 | Walsh et al. |
| 2017/0223310 A1 | 8/2017 | Farrell et al. |
| 2017/0311863 A1 | 11/2017 | Matsunaga |
| 2018/0114017 A1 | 4/2018 | Leitner et al. |
| 2018/0225518 A1 | 8/2018 | Gu et al. |
| 2018/0268222 A1 | 9/2018 | Sohn et al. |
| 2018/0316890 A1 | 11/2018 | Farrell et al. |
| 2018/0341878 A1 | 11/2018 | Azout et al. |
| 2018/0357247 A1* | 12/2018 | Siminoff .......... G08B 13/19606 |
| 2019/0029528 A1 | 1/2019 | Tzvieli et al. |
| 2019/0046044 A1 | 2/2019 | Tzvieli et al. |
| 2019/0052839 A1 | 2/2019 | Farrell et al. |
| 2019/0073523 A1 | 3/2019 | Lee et al. |
| 2019/0122072 A1 | 4/2019 | Cricri et al. |
| 2019/0147333 A1 | 5/2019 | Kallur Palli Kumar et al. |
| 2019/0164173 A1 | 5/2019 | Liu et al. |
| 2019/0179861 A1 | 6/2019 | Goldenstein et al. |
| 2019/0213720 A1 | 7/2019 | Urashita |
| 2019/0213721 A1 | 7/2019 | Urashita |
| 2019/0236614 A1 | 8/2019 | Burgin et al. |
| 2019/0258870 A1 | 8/2019 | Kundu et al. |
| 2019/0278378 A1 | 9/2019 | Yan et al. |
| 2019/0290127 A1 | 9/2019 | Hanina et al. |
| 2019/0290129 A1 | 9/2019 | Hanina et al. |
| 2019/0303655 A1 | 10/2019 | Werner et al. |
| 2019/0313915 A1 | 10/2019 | Tzvieli et al. |
| 2019/0349613 A1 | 11/2019 | Pikes et al. |
| 2019/0355128 A1 | 11/2019 | Grauman et al. |
| 2019/0371145 A1* | 12/2019 | McQueen ............. H04L 63/162 |
| 2019/0378192 A1* | 12/2019 | Fox ...................... G06F 16/5866 |
| 2020/0074183 A1 | 3/2020 | Altuev |
| 2020/0092301 A1 | 3/2020 | Coffing |
| 2020/0159856 A1* | 5/2020 | Mital .................... G06F 16/313 |
| 2021/0289264 A1* | 9/2021 | Booth .................... G06V 20/52 |

OTHER PUBLICATIONS

Article entitled "Searching a Raw Video Database using Natural Language Queries", by Sriram et al., dated Dec. 31, 2020. (Year: 2020).*

Raman, S., "System for Performing Programmatic Operations Using an Image-Based Query Language," U.S. Appl. No. 17/357,698, filed Jun. 24, 2021, 45 pages.

Raman, S., "Image-Based Firewall for Synthetic Media Prevention," U.S. Appl. No. 17/368,658, filed Jul. 6, 2021, 48 pages.

Raman, S., "Image-Based Firewall System," U.S. Appl. No. 17/368,684, filed Jul. 6, 2021, 47 pages.

Raman, S., "Automated Video Verification," U.S. Appl. No. 17/177,659, filed Feb. 17, 2021, 38 page.

Raman, S "Media Player and Video Verification System," U.S. Appl. No. 17/177,451, filed Feb. 17, 2021, 38 page.

Kvochko, E. et al., "Media Verification System," U.S. Appl. No. 16/847,962, filed Apr. 14, 2020, 37 page.

Raman, S., "Media Hosting System Employing a Secured Video Stream," U.S. Appl. No. 17/177,736, filed Feb. 17, 2021, 39 page.

Raman, S., "Video Player for Secured Video Stream," U.S. Appl. No. 17/177,880, filed Feb. 17, 2021, 36 page.

* cited by examiner

FIG. 5

IMAGE-BASED QUERY LANGUAGE SYSTEM FOR PERFORMING DATABASE OPERATIONS ON IMAGES AND VIDEOS

TECHNICAL FIELD

The present disclosure relates generally to media storage and management. More particularly, the present disclosure is related to an image-based query language system for performing database operations on images and videos.

BACKGROUND

Synthetic media, such as so called "deepfake" videos, can be generated to mislead media consumers. For instance, a video of an individual speaking can be edited or generated to make it appear as though a person has spoken words that they did not actually speak and/or performed actions they did not actually perform.

SUMMARY

Synthetic media is becoming increasingly realistic and difficult to recognize. Humans are generally unable to reliably identify images and videos that contain synthetic media. Technology for detecting synthetic media relies on large repositories of the type of media that is being synthesized. For instance, a large repository of videos may be stored, and these videos may be used to train artificial intelligence tools to detect synthetic media. This disclosure recognizes shortcomings of previous technology for managing and using this stored media. For instance, previous technology fails to provide tools for efficiently tracking and managing information in large media repositories. For example, it may be difficult or impossible to efficiently identify who appears in an existing collection of stored videos and/or whether particular individuals are represented in the existing store of videos using previous technology.

Certain embodiments of this disclosure provide unique solutions to technical problems of previous technology, including those described above, by providing a face-based query language (FQL) system that is able to efficiently query stored media and/or integrate stored media into programmatic workflows. For example, the disclosed system provides several technical advantages which may include 1) the efficient and reliable querying of stored media, such that, for example, media of interest can be automatically identified and provided to a user; 2) the automatic selection of appropriate artificial intelligence models for processing queries related to stored media, such that media analysis is performed more efficiently with fewer wasted computing resources; and 3) the reliable mapping between program calls, or programmatic data requests, and the actions needed to complete these calls/requests, such that existing programs can seamlessly obtain information from a media repository. As such, this disclosure may improve the function of computer systems used to manage, store, and/or evaluate stored media. For example, the system described in this disclosure may facilitate the automatic identification of media with queried properties (e.g., media that contains a certain person or certain groups of people, that includes certain feature types, and the like). This was not possible using previous technology. The system described in this disclosure may also or alternatively decrease processing resources required to review media and improve the reliability of the results of this review (e.g., by automatically matching a query to appropriate model(s) for face analysis in image or video media).

In some embodiments, the systems, methods, and devices described in this disclosure may particularly be integrated into a practical application of a FQL system that transforms a natural language query into an appropriately structured FQL query. The FQL query causes at last a portion of media stored in a repository to be analyzed using one or more specially selected artificial intelligence models. The output of the models is then used to generate an appropriate natural language response to the received query. As such, the FQL system improves the technology used to manage, search, and analyze media data, such as images and videos, which is otherwise intractable using previous technology. In some embodiments, the systems, methods, and devices described in this disclosure may be integrated into a practical application of a FQL system that integrates stored media with programmatic operations. The FQL system improves the technology used to operate programmatically based on properties of stored media data, such as images and videos, by facilitating integration with programmatic operations.

Certain embodiments of this disclosure may include some, all, or none of these advantages. These advantages and other features will be more clearly understood from the following detailed description taken in conjunction with the accompanying drawings and claims.

In an embodiment, a system includes a user device and a query system. The user device includes a processor configured to transmit a natural language query provided by a user. The natural language query includes a request for a description of videos stored in a media repository. A network interface of the query system receives the natural language query. The query system determines a command associated with obtaining the description of the videos stored in the media repository requested by the natural language query. The determined command corresponds to an image analysis to perform on at least a portion of the stored videos in order to determine the requested description of the videos stored in the media repository. The query system determines, based at least in part on the determined command, an artificial intelligence model to execute on at least the portion of the stored videos. The query system determines, by executing the determined artificial intelligence model, a model output that includes the requested description of the videos stored in the media repository. The query system provides a response to the natural language query. The response includes the requested description of the videos stored in the media repository.

In another embodiment, a system includes a computing device and a query system. The computing device is operable to execute a computing application. The computing device generates a call in a programming language of the computing application requesting a feature of videos stored in a media repository. The query system receive the call generated by the computing device. The query system determines a command associated with obtaining the feature requested by the call. The determined command corresponds to an image analysis to perform on at least a portion of the stored videos in order to determine the requested feature. The query system determines, based at least in part on the determined command, an artificial intelligence model to execute on at least the portion of the stored videos. The query system determine, by executing the determined artificial intelligence model, a model output that includes the requested feature. The query system provides, in the programming language of the computing application, an indication of the requested feature.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably managing media data, such as images and videos used to train tools for detecting synthetic media. Previous technology particularly fails to provide tools for efficiently managing and using information in large media repositories. For example, it may be difficult or impossible to efficiently identify who appears in an existing collection of stored videos and/or whether particular individuals are represented in the existing store of videos using previous technology. Previous technology is also incapable of integrating information from media repositories with programmatic functions. For example, using previous technology it is generally not possible to provide appropriate information about stored media in response to a call for information from a computing application or program (e.g., a call that is in a particular programming language used by that computing application).

As used in this disclosure, media generally refers to video, images, and/or audio content. However, media encompasses any other appropriate media which may be shared and/or distributed in a digital format. An example of media for a subject is a video of the subject speaking. As used in this disclosure, "synthetic media" refers to media which has been edited to attribute actions and/or words to a subject that were not performed/spoken by the subject. For example, a "synthetic" video may include an edited version of a "real" video of the subject speaking which has been created or edited to show the subject speaking words that were not actually spoken by the subject in the real video.

Face-Based Query Language System

Figure 1:
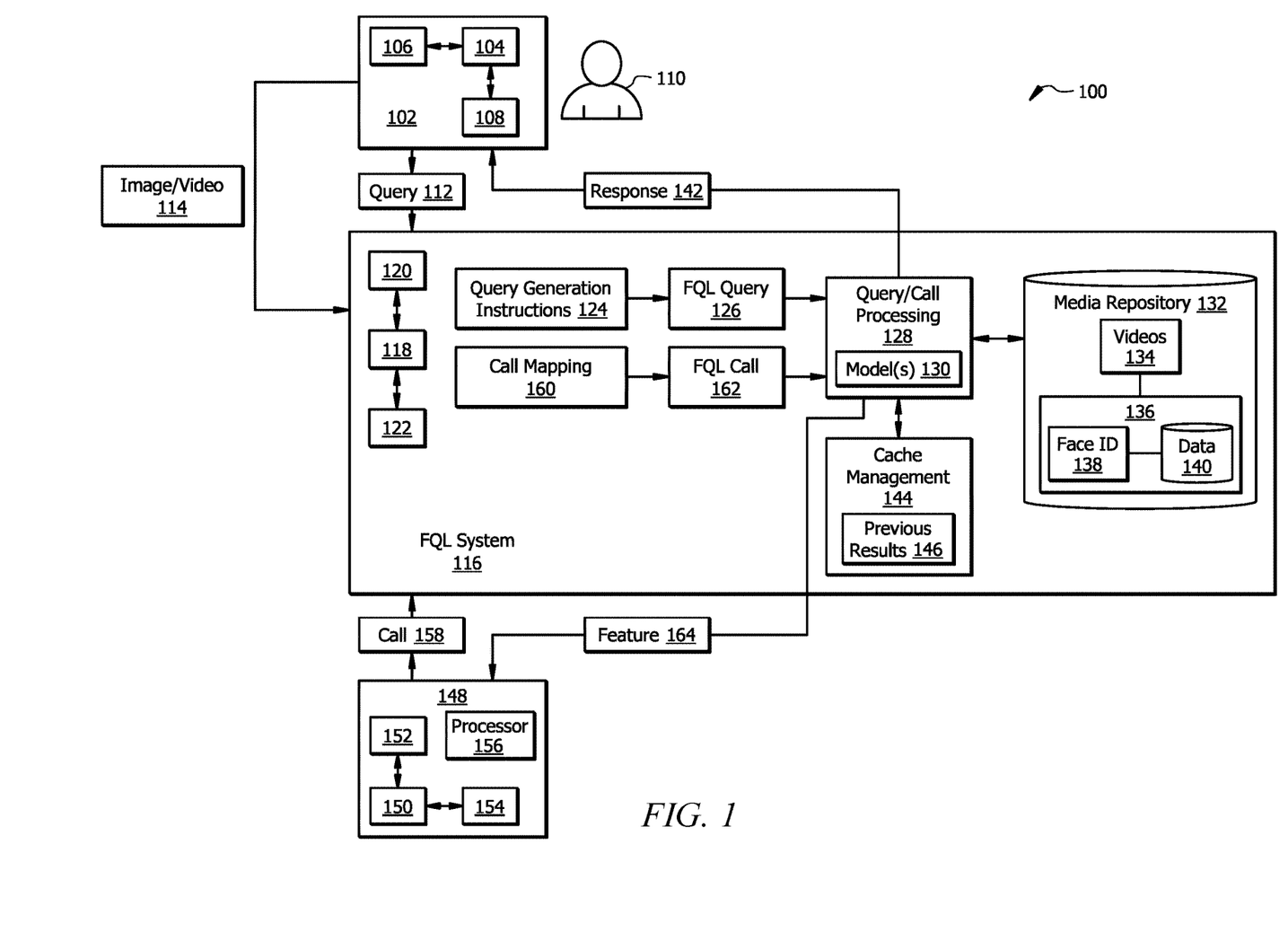
FIG. 1 is a schematic diagram of an example system configured for implementing FQL queries and responses and/or integrating stored media with computing application calls.

FIG. 1 is a schematic diagram of an example media system 100. The media system 100 includes a user device 102, a face query language (FQL) system 116, and a computing device 148. As described in the following, in certain embodiments, the FQL system 116 is operable to provide a natural language response 142 to a query 112 requesting information about videos 134 stored in a media repository 132 and/or one or more images/videos 114 provided to the FQL system 116. In these embodiments, the FQL system 116 improves the functioning of the media repository 132 by allowing a user 110 to efficiently manage, search, and perform other tasks using videos 134 (or other media types) stored by the media repository 132. The FQL system 116 allows media, such as videos 134, stored in a media repository 132 to be searched as though it were a database. Such searching is not possible using previous technology.

As also described below, in certain embodiments, the FQL system 116 also or alternatively facilitates the integration between information stored in the media repository 132 and a computing application or program 156. For example, the FQL system 116 may receive a call 158 in a programming language used by the computing program 156 for certain feature(s) 164 of videos 134 (or other media) stored in the media repository 132. For example, the computing program 156 may send a call 158 requesting some information about the stored videos 134 and/or another image/video 114 provided to the FQL system 116 that can facilitate tasks of the computing application 156 (e.g., identifying people in a video 134 and/or an image/video 114 that should be indicated as present at an event recorded by the video 134 or image/video 114). In response to the call 158, the FQL system 116 performs query/call processing 128 using one or more specially selected artificial intelligence model(s) 130 to determine features 164 which are then provided in usable format to the computing program 156 (e.g., in the programming language used by the computing program 156).

The user device 102 is generally any appropriate computing device, such as a computer, smartphone, tablet, personal assistant device, or the like, that is operable to receive an input from a user 110 indicating a query 112 that is provided to the FQL system 116. The query 112 may be in a natural language of the user 110. A natural language corresponds to a language spoken and understood by at least a subset of people. English is an example of a natural language. The query includes a request for a description of one or more features or properties of videos 134 (or other media) stored in the media repository 132. For example, the query 112 may be a question, such as: "Do the stored videos include a video of person X?"; "Do the stored videos include video of people X and Y together?"; "Which known people are represented in the stored video recordings?"; "Is person X in a provided video/image?"; "Who is the person in this video/image?"; and the like. A corresponding natural language response 142 is determined and provided by the FQL system 116, described below.

The user device 102 includes a processor 104, memory 106, and network interface 108. The processor 104 of the user device 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The memory 106 of the user device 102 is operable to store the query 112, response 142, and any data, instructions, logic, rules, or code operable to execute the functions of the user device 102. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may comprise read-only memory (ROM), random-access memory (RAM), ternary content-addressable memory (TCAM), dynamic random-access memory (DRAM), and static random-access memory (SRAM).

The network interface 108 of the user device 102 is configured to enable wired and/or wireless communications. The network interface 108 is configured to communicate data between the user device 102 and other network devices, systems, or domain(s), such as the FQL system 116. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 communicates the query 112 to the FQL system 116 and receives the corresponding response 142.

The FQL system 116 is generally one or more computing devices operable to receive a query 112 and/or a programming call 158 and generate a response 142 to the query 112 and/or provide a feature 164 requested by the programming call 158. The FQL system 116 includes a processor 118, memory 120, and network interface 122. The processor 118 of the FQL system 116 includes one or more processors. The processor 118 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 118 may be a programmable logic device, a microcontroller, a microprocessor, or any suitable combination of the preceding. The processor 118 is communicatively coupled to and in signal communication with the memory 120 and network interface 122. The one or more processors are configured to process data and may be implemented in hardware and/or software. For example, the processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory 120 and executes them by directing the coordinated operations of the ALU, registers and other components.

The memory 120 of the FQL system 116 is operable to store query generation instructions 124, instructions for executing artificial intelligence model(s) 130, the media repository 132, call mapping 160, previous results 146, and any data, instructions, logic, rules, or code operable to execute the functions of the FQL system 116. The memory 120 includes one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM).

The network interface 122 of the FQL system 116 is configured to enable wired and/or wireless communications. The network interface 122 is configured to communicate data between the FQL system 116 and other network devices, systems, or domain(s), such as the user device 102 and computing device 148. The network interface 122 is an electronic circuit that is configured to enable communications between devices. For example, the network interface 122 may include one or more serial ports (e.g., USB ports or the like) and/or parallel ports (e.g., any type of multi-pin port) for facilitating this communication. As a further example, the network interface 122 may include a WIFI interface, a local area network (LAN) interface, a wide area network (WAN) interface, a modem, a switch, or a router. The processor 118 is configured to send and receive data using the network interface 122. The network interface 122 may be configured to use any suitable type of communication protocol as would be appreciated by one of ordinary skill in the art. In some embodiments, the network interface 122 receives the query 112 and communicates the corresponding response 142. In some embodiments, the network interface 122 receives the call 158 and communicates the corresponding feature 164.

For query 112/response 142 processing, the FQL system 116 includes query generation instructions 124. The query generation instructions 124 generally translate the natural language query 112 into an appropriately structured FQL query 126. For example, query generation instructions 124 may include rules for converting natural language phrases into appropriately structured commands for searching or analyzing information stored in the media repository 132. The FQL query 126 is generated from these commands using the query generation instructions 124. As an example, the query generation instructions 124 may be used to transform an example natural language query 112 of "Which employees appear in the stored videos?" to the FQL query 126 of "select * from stored videos where Employees exists." Further details and examples of determining an FQL query 126 are described with respect to FIG. 2 below.

The FQL query 126 is provided to query/call processing 128, which involves the application of one or more artificial intelligence models 130 that are selected to identify the appropriate response 142 to the received query 112. Selection and implementation of artificial intelligence model(s) 130 is described in greater detail below with respect to the examples of FIGS. 2 and 3. In brief, the FQL system 116 determines a command (e.g., command 210 of FIG. 2) associated with obtaining a description of a feature or property to include in the response 142 to the query 112. The command may correspond to an image analysis to perform on at least a portion of the videos 134 stored in the media repository 132 and/or a received image/video 114 in order to determine the information or description to include in the response 142. Based at least in part on the determined command, one or more of the artificial intelligence models 130 is identified to execute on at least a portion of the stored videos 134 and/or the received image/video 114. The FQL system 116 is in communication with the media repository 132, such that the identified artificial intelligence models 130 are executed using the videos 134 to generate an output (e.g., output 218a,b of FIG. 2) that includes or can be used to determine the information to include in the response 142 to the query 112. The response 142 is generated in the appropriate natural language of the user 110 (e.g., the same language as the query 112) and provided for presentation at the user device 102.

The media repository 132 may be a data store, database, or the like that stores videos 134 (and optionally other media). In some cases, videos 134 (and/or other media) may be preprocessed using the artificial intelligence model(s) 130, such that, in addition to storing the original videos 134, the media repository 132 stores a record 136 of face identities 138 (e.g., identities of faces appearing in the videos 134) and/or other corresponding data 140 (e.g., names associated with the faces, amount of time a face or person appears in videos 134, face views presented in the videos 134, etc.). This record 136 may facilitate more rapid response 142 generation in some cases, because extensive machine learning-based analysis of the videos 134 may not be needed to determine the response 142 for every query 112.

In some cases, the FQL system 116 uses cache management 144 determine whether a request indicated by the query 112 has previously been processed and whether previous results 146 are already stored for the request. If this is the case, processing resources may be conserved by not unnecessarily repeating query/call processing 128 for the query 112. Instead, the previous results 146 may be used to provide the response 142. The cache management 144 may be a data store, database, or the like that stores the previous results 146 in a searchable format.

The computing device 148 of FIG. 1 may be any appropriate computing device for executing a computing application or program 156. For example, the computing device 148 may be a computer, smartphone, tablet, personal assistant device, or the like. The computing device 148 executes the computing program 156, provides a call 158 to the FQL system 116 (e.g., in a programming language of the computing program 156), and receives a feature 164 that was requested by the call 158. The call 158 may be a request for information about a provided image/video 114 and/or videos 134 stored in the media repository 132. For example, the call 158 may request a feature 164 of an image/video 114 and/or videos 134 stored in the media repository 132. The call 158 may be in a programming language of the computing program 156 or in any appropriate format that is interpretable by the computing program 156 and the FQL system 116. For instance, the feature 164 may be an indication (e.g., of yes or no) of whether the image/video 114 and/or the videos 134 include a given person or group of people, an identification of people in the image/video 114 and/or videos 134, or the like (see FIG. 2). In some cases, as illustrated in FIG. 3, the computing device 148 provides additional information to the FQL system 116, such as a list of person identifiers that are used in part to determine the feature 164. For example, such a list may be used to determine whether certain expected attendees were present at an event recorded in a video 134. The computing device 148 generally uses the feature(s) 164 provided by the FQL system 116 (as described below and with respect to FIGS. 2 and 3) to perform programmatic functions (e.g., automatically send confirmation of attendance for an event).

The computing device 148 includes a processor 150, memory 152, and network interface 154. The processor 150 of the computing device 148 includes one or more processors. The processor 150 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 150 may be a programmable logic device, a microcontroller, a microprocessor, or any suitable combination of the preceding. The processor 150 is communicatively coupled to and in signal communication with the memory 152 and network interface 154. The one or more processors are configured to process data and may be implemented in hardware and/or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions from memory 152 and executes them by directing the coordinated operations of the ALU, registers and other components.

The memory 152 of the computing device 148 is operable to store the call 158, feature 164, and any data, instructions, logic, rules, or code operable to execute the functions of the computing device 148. The memory 152 includes one or more disks, tape drives, or solid-state drives, and may be used as an over-flow data storage device, to store programs when such programs are selected for execution, and to store instructions and data that are read during program execution. The memory 152 may be volatile or non-volatile and may comprise read-only memory (ROM), random-access memory (RAM), ternary content-addressable memory (TCAM), dynamic random-access memory (DRAM), and static random-access memory (SRAM).

The network interface 154 of the computing device 148 is configured to enable wired and/or wireless communications. The network interface 154 is configured to communicate data between the computing device 148 and other network devices, systems, or domain(s), such as the FQL system 116. The network interface 154 is an electronic circuit that is configured to enable communications between devices. For example, the network interface 154 may include one or more serial ports (e.g., USB ports or the like) and/or parallel ports (e.g., any type of multi-pin port) for facilitating this communication. As a further example, the network interface 154 may include a WIFI interface, a local area network (LAN) interface, a wide area network (WAN) interface, a modem, a switch, or a router. The processor 150 is configured to send and receive data using the network interface 154. The network interface 108 may be configured to use any suitable type of communication protocol as would be appreciated by one of ordinary skill in the art. The network interface 108 communicates the call 158 to the FQL system 116 and receives the corresponding feature 164.

Returning to the FQL system 116, for call 158/feature 164 processing, the FQL system 116 includes a call mapping 160 that include rules for transforming the call 158, which may be in a programming language used by the computing program 156 into an appropriately structured FQL call 162. For example, call mapping 160 may include rules for converting programmatic commands, requests, and/or instructions from the call 158 into corresponding appropriately structured commands for searching or analyzing information stored in the media repository 132. The FQL call 162 is generated from these commands using the call mapping 160. As an example, the call mapping 160 may indicate that a call 160 of "getPeopleCount" maps to, or is transformed to, the FQL call 162 of "sum*face IDs from media repository." Further details and examples of determining an FQL call 162 are provided with respect to FIG. 2 below.

The FQL call 162 is then used similarly to the FQL query 126, described above, to determine feature(s) 164 to provide to the computing device 148. For example the FQL call 162 may be provided to query/call processing 128, which involves the application of one or more artificial intelligence models 130 that are specially selected to identify the appropriate feature(s) requested by the call 158 (see FIG. 2). Selection and implementation of artificial intelligence model(s) 130 is described in greater detail below with respect to the examples of FIGS. 2 and 3. The FQL system 116 may also use the cache management 144 to determine if previous results 146 are available for the call 158, such that processing resources expended executing artificial intelligence models 130 may be decreased.

Example FQL System Operation for Query Response Generation

Figure 2:
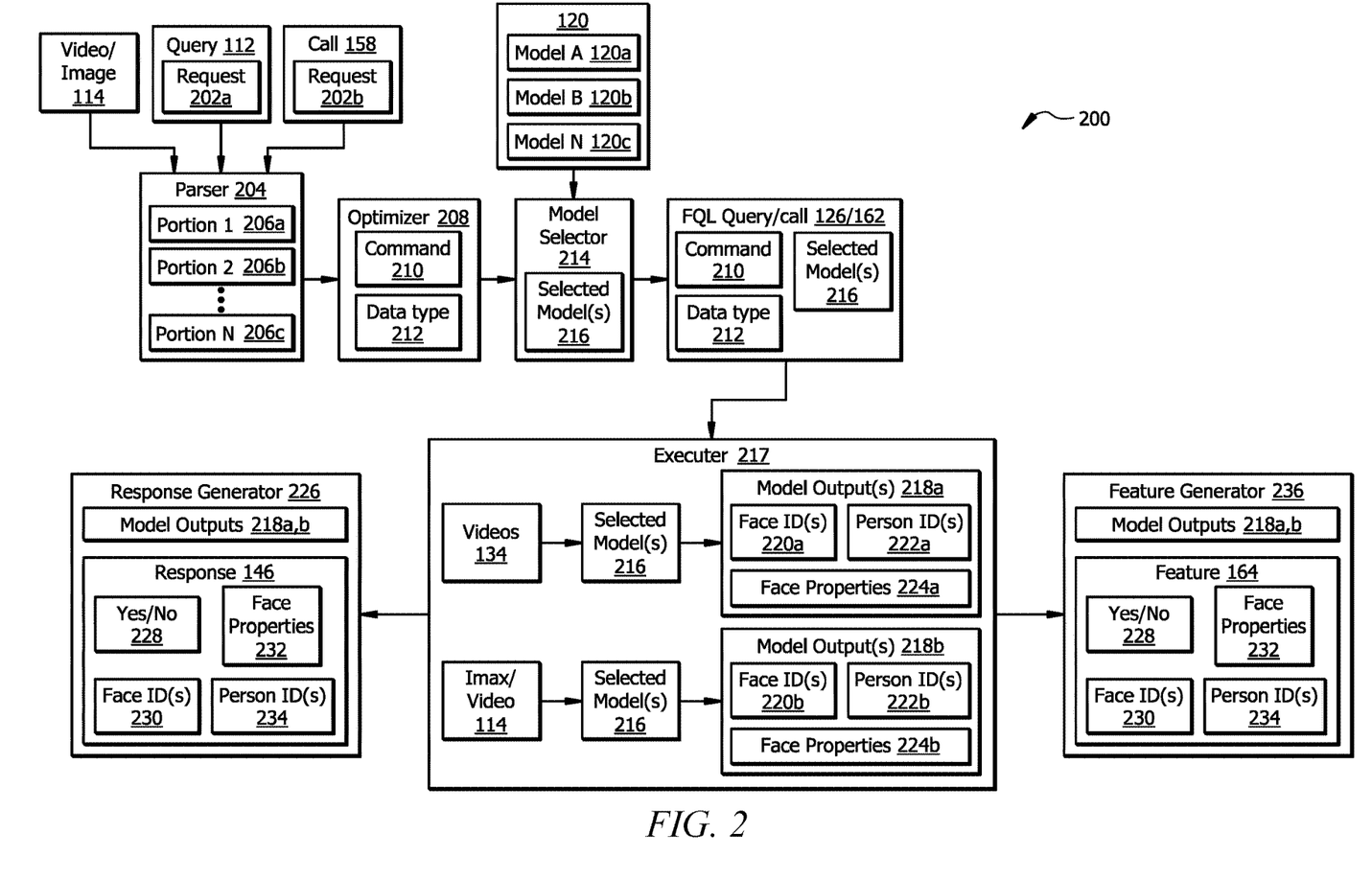
FIG. 2 is a flow diagram illustrating FQL query/call response generation in greater detail.
Figure 3:
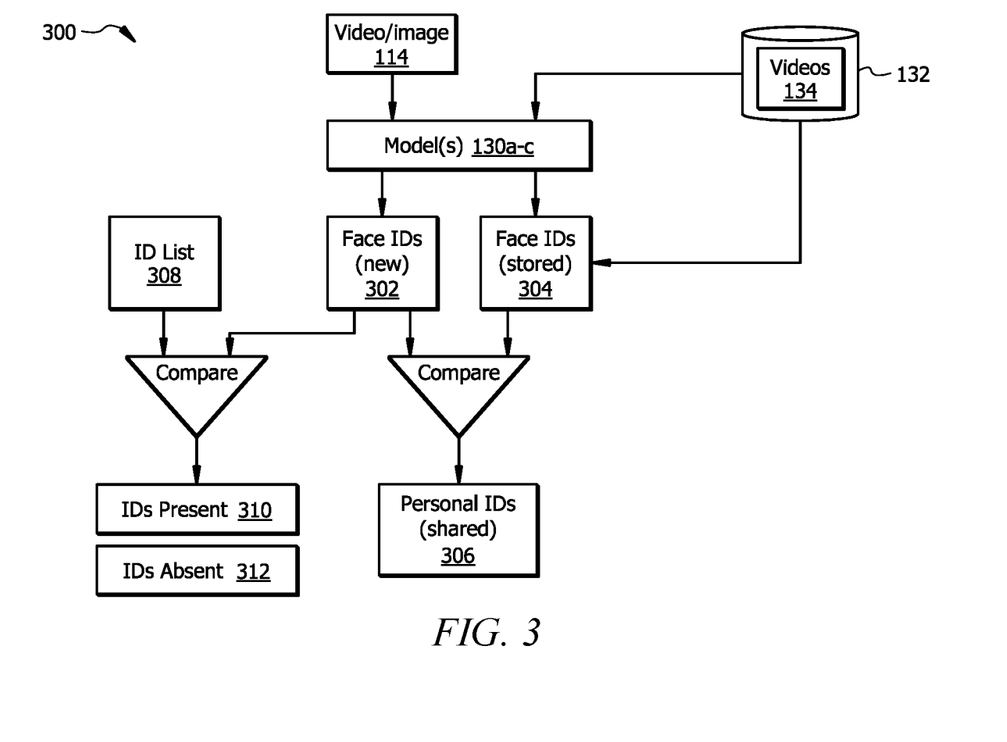
FIG. 3 is a flow diagram illustrating examples of the generation of query/call responses.

FIG. 2 shows a flow diagram 200 illustrating an example operation of the FQL system 116 for determining a response 142 to a received query 112. Operations related to integrating the FQL system 116 with calls 158 from a computing program 156 are also illustrated in FIG. 2 and are described in the subsection below. For the sake of illustration, certain functions of the FQL system 116 are illustrated in FIG. 2 as being executed by various subcomponents of the FQL system 116 including a parser 204, optimizer 208, model selector 214, executor 217, response generator 226, and feature generator 236. These subcomponents and their functions are implemented using the processor 118, memory 120, and network interface 122 of the FQL system 116.

In the example of FIG. 2, a query 112 is received that includes a request 202a. The request 202a is generally a request for a description of features or properties of videos 134 stored in the media repository 132 and/or of a received image/video 114. Example requests 202a may be a request for an indication of whether a given person appears in videos 134 stored in the media repository 132 and/or of a received image/video 114, a request for an indication of whether two or more different people appear together in the stored videos 134 and/or an image/video 114, a request for an indication of who appears in the stored videos 134 and/or an image/video 114, a request for an indication of whether the stored videos 134 include a video of a person appearing in a received image/video 114, and the like.

The received query 112 is provided to the parser 204, which may identify portions 206a-c of the query 112. The different portions 206a-c may be used by the optimizer 208 (described below) to identify commands 210 and/or data types 212 that are subsequently used to identify appropriate artificial intelligence models 130 to use for image analysis by the model selector 214. For instance, for an example query 112 of "Does person X appear in the stored videos?", a first portion 206a may be "person X" corresponding to an identity that will be searched for in videos 134, a second portion 206b may be "appears" corresponding to an eventual search command 210 that will be performed for the query 112, and a third portion 206c may be "in the stored videos" corresponding to a location of the search (e.g., a data type 212 to search). While the example of FIG. 2 shows three portions 206a-c being determined for the received query 112, it should be understood that any appropriate number of portions 206a-c may be determined for a given query 112.

The determined portions 206a-c are provided to the optimizer 208. The optimizer 208 determines at least one command 210 associated with obtaining the information requested by the natural language query 112. The determined command 210 may correspond to an image analysis to perform on at least a portion of the stored videos 134 and/or the received image/video 114 in order to determine the information requested by the query 112. For example, the optimizer 208 may determine that a person search command 210 is needed for the example portion 206b of "appears" that is described above. The optimizer 208 may also determine a data type 212 that should be acted on by the command 210. For example, the optimizer 208 may determine that the data type 212 is video data (e.g., stored videos 134) based on the example portion 206c of "in the stored videos" that is described above. For a given query 112, one or more commands 210 and data types 212 may be determined.

The model selector 214 receives information from the optimizer 208 (e.g., receives the command 210 and data type 212) and determines, based at least in part on this information, one or more selected artificial intelligence models 216 (e.g., out of available models 130, described with respect to FIG. 1 above) to apply to at least a portion of the stored videos 134 and/or the received image/video 114. For example, the model selector 214 may select one or more of the artificial intelligence models 130 that are capable of performing the image analysis associated with the determined command(s) 210. For example, the artificial intelligence models 130 may include a first model 130a that is a person detection model. The first model 130a may be selected as model 216 for a person search command 210 in order to determine, using person detection image analysis, whether a given person appears in the stored videos 134. As another example, a second artificial intelligence model 130b may be a multiple-person detection model that can determine, for a command 210 to detect multiple people in the stored videos 134, whether two different people appear together in the stored videos 134. The multiple-person detection model 130b may be similar to the person detection model 103a but capable of detecting multiple people in a given video 134. As yet another example, the third artificial intelligence model 130c may be a face identification model that determines, for a command 210 to identify faces (e.g., face identifiers 220a,b) in stored videos 134 and/or received image/video 114.

The FQL system 116 then generates the FQL query 126, which may include the command(s) 210, data type(s) 212, and/or an indication of the selected model(s) 216. The FQL query 126 is provided to the executor 217. The executor 217 determines, by executing the determined artificial intelligence model(s) 216, one or more model outputs 218a,b that include the information requested by the query 112. For example, for a request 202a associated with analyzing contents of stored videos 134 and/or received image/video 114, selected model(s) 216 may be applied to the stored videos 134 to determine outputs 218a and 218b, respectively.

The outputs 218a,b may include face identifiers 220a,b, person identifiers 222a,b, and/or face properties 220a,b. The face identifiers 220a,b generally identify faces detected in the videos 134 and/or image/video 114. The face identifiers 220a,b may not provide any identifying information for a person associated with a given face. For example, a face identifier 220a,b may be an arbitrary name or string of characters assigned to a face appearing in the videos 134. The person identifiers 222a,b generally link detected faces for each face identifier 220a to a real-world person. A person identifier 222a,b may be a person's name or a code name assigned to a person (e.g., to maintain anonymity of information generated by the FQL system 116). The face properties 224a,b generally correspond to features or properties such as the number of videos 134 in which a given face/ person appears; a presented angle of faces in the videos 134; the amount of time a face/person is presented in the videos 134; types of facial expressions, movements, speech, or the like presented for certain faces in the videos 134; and the like. The face properties 224a,b may provide insights into how useful given videos 134 in the media repository 132 will be for training algorithms for the detection of synthetic media. The model output 218a,b may be stored in the FQL system for later use (e.g., as record 136 and/or previous results 146 of FIG. 1), such that repeated execution of certain artificial intelligence models 130 is not required, thereby conserving processing resources.

The model output(s) 218a,b may be provided to the response generator 226, which uses the outputs 218a,b to generate the response 142 to the query 112. The response 142 may include a yes/no indication 228 (e.g., in response to a yes/no question posed in the query 112), one or more face identifiers 230 or person identifiers 234 (e.g., identifiers 220a,b and/or 222a,b identifying faces or people searched for by the query 112), and/or face properties 232 (e.g., providing face properties 224a,b requested by the query 112). The response 142 that includes requested description of features or properties (e.g., the yes/no indication 248, face identities 230, person identifiers 234, and/or face properties 232) of the stored videos 134 and/or received image/video 114 is then provided to the user device 102.

As an example, for a request 202a for a yes/no indication 228 of whether a given person appears in videos 134 stored in the media repository 132 and/or in a received image/video 114. The output 218a,b of a person search model 130a-c may be provided to the response generator 226. The output 218a,b may indicate person identifiers 222a,b for all detected people. If the person identifiers 222a,b of the model output 218a,b indicates that the requested person appears in the stored videos 134 (e.g., if the requested person from the query 112 corresponds to one of the person identifiers 222a,b), the response 142 is generated with a natural language "yes" indication 248 that the person appears in the stored videos 134 and/or the image/video 114. Otherwise, if the model output 218a,b indicates that the person does not appear in the stored videos 134, the response 142 includes a natural language "no" indication 248 that the person does not appear in the stored videos 134 and/or the image/video 114. As such, information about the content of stored videos 134 and/or received image/video 114 can be efficiently determined without manually reviewing each video 134 and without users having to be able to identify a large number of potentially unfamiliar people.

As another example, for a request 202a for an indication of whether two or more different people appear together in stored videos 134, a multiple-person detection model 130a-c may be applied to the stored videos 134 to determine if the people person appear together in videos 134. If the model output 218a indicates that the people appear together in the stored videos 134, the response includes a "yes" indication 248. Otherwise, the response 142 includes a "no" indication 248. As another example, for a request 202a for an indication of who appears in the stored videos 134 and/or received image/video 114, a person identification model 130a-c may be applied to the stored videos 134 and/or received image/video 114. The resulting face identifiers 220a,b and/or person identifiers 222a,b may be used to determine the appropriate person identifiers 234 to include the response 142 for the request 202a.

For further illustration of operations of the FQL system 116, FIG. 3 shows a flow diagram 300 illustrating the determination of appropriate identifiers 306 to include in a response 142 for a query 112 with a request 202a for an indication of whether the stored videos 134 include a video 134 of a person appearing in a received image/video 114 and/or an identification of this person. This may be achieved, for example, by identifying a face identification command 210 (see FIG. 2) and selecting a face identification model 130a-c for obtaining information to execute this command 210. The face identification model 130a-c is applied to the received image/video 114 to determine a first set of identities 302 ("face IDs (new)" in FIG. 3) corresponding to faces appearing in the received image/video 114. The face identification model 130a-c is also applied to the stored videos 134 to determine a second set of identities 304 ("face IDs (stored)" of FIG. 3) corresponding to faces appearing in the stored videos 134. A third set of identities 306 ("person IDs (shared)" of FIG. 3) that appear in both the first set of identities 302 and the second set of identities 304. Referring again to FIG. 2, the third set of identities 306 may be included in the response 142 (e.g., as person identifiers 234).

Still referring to FIG. 3, as another example, the FQL system 116 may receive an image/video 114 along with the query 112. The query 112 may include a request 202a for a yes/no indication 228 of whether the stored videos 134 include a video of a person appearing in the received image/video 114. The FQL system 116 may determine that a face identification command 210 should be executed and determine the selected model 216 as a face identification model. The face identification model 216 is applied to the received image/video 114 to determine a first set 302 of identities corresponding to faces appearing in the received image/video 114. The face identification model 216 is applied to the stored videos 134 to determine a second set of identities 304 corresponding to faces appearing in the stored videos 134. The FQL system 16 may determine whether at least one identity appears in both the first set 302 and the second set 304 of identities (e.g., whether there is at least one identity in a shared set of identities 306. If at least one identity appears in both the first set of identities 302 and the second set of identities 306, the response 142 includes an indication that the stored videos 134 include a person from the provided image/video 114. Otherwise, if at least one identity does not appear in both the first set of identities 302 and the second set of identities 306, the response 142 includes an indication that the stored videos 134 do not include a person from the provided image/video 114.

Figure 4:
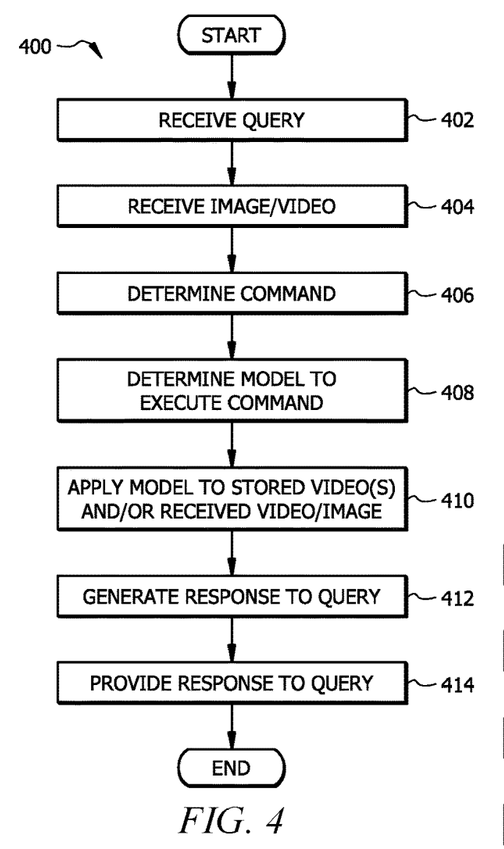
FIG. 4 is a flowchart illustrating an example method of FQL query and response generation using the system of FIG. 1.

FIG. 4 shows a flowchart 400 of an example method 400 for operating the FQL system 116 to generate a response to a query 112. The method 400 may be executed by the processor 118, memory 120, and network interface 122 of the FQL system 116. The method 400 may begin at step 402 where the query 112 is received. As described above with respect to FIGS. 1 and 2, the query 112 includes a request 202a in a natural language for a description of stored videos 134 and/or a provided image/video 114. At step 404, an image/video 114 may be received. For example, if the request 202a is for some description of the image/video 114 (e.g., of persons appearing in the image/video 114, of a comparison of the image/video 114 to stored videos 134, etc.), then the image/video 114 is also provided.

At step 406, a command 210 is determined that is associated with obtaining the description requested by the query 112. The determined command 210 corresponds to an image analysis to perform on at least a portion of the stored videos 134 and/or the image/video 114 from step 404 (if received) in order to determine the information requested by the query 112. Examples of the determination of a command 210 is described in greater detail above with respect to the optimizer 208 of FIG. 2.

At step 408, an artificial intelligence model 216 is determined (e.g., from the set of available artificial intelligence models 130) to execute on at least the portion of the stored videos 134 and/or the received image/video 114. The selected artificial intelligence model 216 is determined based at least in part on the determined command 210 from step 406. For example, if a person search command 210 is determined at step 406, then a person search model 130 may be selected at step 408. As another example, if a multiple-person search command 210 is determined at step 406, then a multiple-person detection model 130 may be selected at step 408. Other examples of selecting an appropriate artificial intelligence model 130 are described with respect to the model selector 214 of FIG. 2 above.

At step 410, the selected artificial intelligence model 216 is executed by applying the model 216 to at least a portion of the stored videos 134 and/or the received image/video 114. For example model output(s) 218a,b may be determined as described above with respect to FIG. 2.

At step 412, a response 142 is determined based at least in part on the model output(s) 218a,b from step 410. For example, a portion of the model output(s) 218a,b may be selected to include in the response 142 and/or an appropriate yes/no indication 228 may be determined using information from the model output(s) 218a,b. FIG. 3 also illustrates an example of determining a set of identifiers 306 to include in a response 142 based on a comparison of faces detected in stored videos 134 and a received image/video 114.

At step 414, the response 142 from step 412 is transmitted (e.g., by the network interface 122 of the FQL system 116). The response 142 includes the description requested by the query 112. The response 142 may be in a natural language, such as the same natural language as the query 112. User 110 may view the response 142 and use it to more efficiently and effectively select videos 134 from the media repository 132 to create tools for detecting synthetic media than was possible using previous technology.

Example FQL System Operation for Programmatic Call Integration

Returning to FIG. 2, the flow diagram 200 also illustrates an example operation of the FQL system 116 for integrating the media repository 132 with programmatic calls 158, such that an appropriate feature 164 can be determined for information stored in the media repository 132 in order to perform programmatic functions of a computing program 156 (see FIG. 1). In the example of FIG. 2, a call 158 is received that includes a request 202b. The request 202b is generally a request for feature(s) 164 of videos 134 stored in the media repository 132 and/or of a received image/video 114. Example features 164 are an indication of whether a given person appears in videos 134 stored in the media repository 132, an indication of whether two or more different people appear together in the stored videos 134, an indication of who appears in the stored videos 134, an indication of who appears in a received image/video 114, an indication of whether the stored videos 134 include a video 134 of a person appearing in a received image/video 114, and the like.

Similarly to as described above for determining a natural language response 142 to a query 112, the received call 158 is provided to the parser 204, which may identify portions 206a-c of the call 158. The different portions 206a-c may be used by the optimizer 208 to identify commands 210 and/or data types 212 that are subsequently used to identify appropriate artificial intelligence models 130 to use for feature 164 determination. For instance, for an example call 158 of "getPeopleCount", a first portion 206a may be "People" corresponding to an identity that will be searched for in videos 134 and a second portion 206b may be "Count" corresponding to a counting operation that will be performed.

The determined portions 206a-c are provided to the optimizer 208. The optimizer 208 determines at least one command 210 associated with obtaining the information requested by the call 158. The determined command 210 may correspond to an image analysis to perform on at least a portion of the stored videos 134 and/or the received image/video 114 in order to determine the information requested by the call 158. For example, the optimizer 208 may determine that a person count command 210 is needed for the example portion 206a of "People" that is described above. The optimizer 208 may also determine a data type 212 that should be acted on by the command 210. For example, the optimizer 208 may determine that the data type 212 is video data (e.g., stored videos 134). For a given call 158, one or more commands 210 and data types 212 may be determined.

The model selector 214 receives information from the optimizer 208 (e.g., receives the command 210 and data type 212) and determines, based at least in part on this information, one or more selected artificial intelligence models 216 to apply to at least a portion of the stored videos 134 and/or the received image/video 114. For example, the model selector 214 may select one or more of the artificial intelligence models 130 that are capable of performing the image analysis associated with determined command(s) 210. For example, the artificial intelligence models 130 may include a first model 130a that is a person detection model. The first model 130a may be selected as model 216 for a person search command 210 in order to determine, using person detection image analysis, whether a given person appears in the stored videos 134. As another example, a second artificial intelligence model 130b may be a multiple-person detection model that can determine, for a command 210 to detect multiple people in the stored videos 134, whether two different people appear together in the stored videos 134. As yet another example, the third artificial intelligence model 130c may be a person count model that determines, for a command 210 to count the unique faces detected in stored videos 134 and/or received image/video 114. The count of faces may be provided, for example, as a face property 232a,b of FIG. 2.

The FQL system 116 then generates the FQL call 162, which may include the command(s) 210, data type(s) 212, and/or an indication of the selected model(s) 216. The FQL call 162 is similar to the FQL query 126, described above, but causes the executor 217 to pass model outputs 218a,b to a feature generator 236 rather than the response generator 226 that is described with respect to generating a query 112 response 142 above. The FQL call 162 is provided to the executor 217. As described above, the executor 217 determines, by executing the determined artificial intelligence model(s) 216, one or more model outputs 218a,b that include the information requested by the call 158. For example, for a request 202b associated with analyzing contents of stored videos 134 and/or a received image/video 114, selected model(s) 216 may be applied to the stored videos 134 to determine outputs 218a and 218b, respectively. The outputs 218a,b may include face identifiers 220a,b, person identifiers 222a,b, and/or face properties 232a,b, as described above with respect to the example of generating a response 142 to a query 112.

The model output(s) 218a,b may be provided to the feature generator 236, which uses the outputs 218a,b to generate the feature 164 requested by the call 158. The feature 164 may include the same or similar information to that included in the response 142 to the query 112, described above. The feature 164 however, is generally provided in a format that is readily usable by the computing program 156 (e.g., in the programming language used by the computing program 156). For example, the feature 164 may include a yes/no indication 228 (e.g., in response to a yes/no question posed in the call 158), one or more face identifiers 230 or person identifiers 234 (e.g., identifiers 220a,b and/or 222a,b identifying faces or people searched for by the call 158), and/or face properties 232 (e.g., providing face properties 224a,b requested by the call 158). The feature 164 is then provided to the computing device 148.

Similarly to as described above for the example determination of responses 142 to queries 112, features 164 may be determined for calls 158 with a range of requests 202b, including but not limited to a request 202b for a yes/no indication 228 of whether a given person appears in videos 134 stored in the media repository 132 and/or in a received image/video 114, a request 202b for an indication of whether two or more different people appear together in stored videos 134 and/or image/video 114, and the like.

As a further example, the flow diagram 300 of FIG. 3 illustrates the determination of a yes/no indication 228 of whether each individual indicated in a list 308 of individuals appears in an image/video 114. For example, the list 308 may identify expected attendees of an event that was recorded by the image/video 114. The yes/no indication 228 may be used by the computing program 156 to perform programmatic functions, such as confirm attendance at the event, request payment for attending the event, provide rewards for attending the event, etc. This may be achieved, for example, by identifying a face identification command 210 (see FIG. 2) and selecting a face identification model 130a-c for obtaining information to execute this command 210. The face identification model 130a-c is applied to the received image/video 114 to determine a first set of identities 302 ("face IDs (new)" in FIG. 3) corresponding to faces appearing in the received image/video 114. The first set of identities 302 is compared to the list 308 to determine whether the individuals in the list 308 appear in the image/video 114. Based on this comparison, the FQL system 116 may determine present identifiers 310 for individuals from the list 308 that appear in the image/video 114 and absent identifier 312 for individuals in the list 308 that are absent from the image/video 114. The present identifiers 310 and absent identifiers 312 may be used to determine the yes/no indication 228 of whether the individuals in the list 308 appear in the image/video 114, which is provided as at least portion of the feature 164 to the computing application 156. In some cases, the FQL system 116 may further determine which of the detected individuals from the first set of identifiers 302 have already received attendance rewards, etc. using the list 308, determine which of the detected individuals from the first set of identifiers 302 have yet to pay (or receive attendance rewards, etc.), and provide this information as at least a portion of the feature 164.

Figure 5:
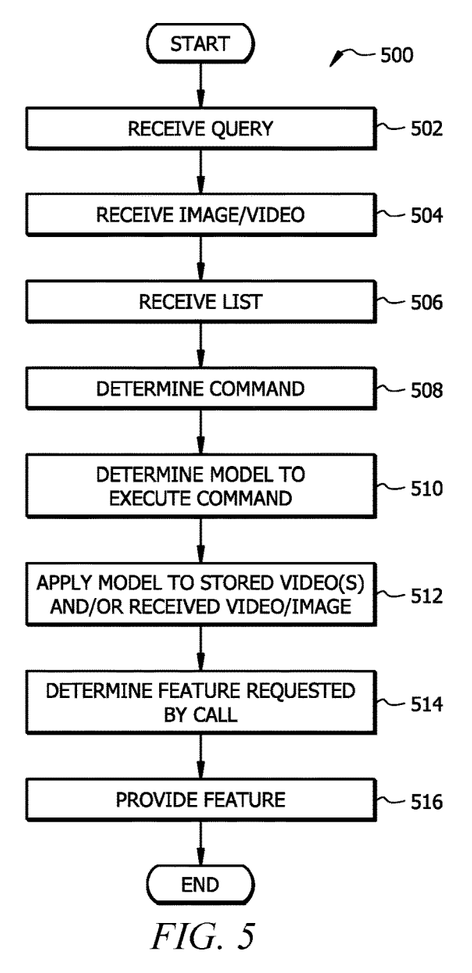
FIG. 5 is a flowchart illustrating an example method of FQL-based integration of properties of stored media with programmatic calls using the system of FIG. 1.

FIG. 5 shows a flowchart 500 of an example method 500 for operating the FQL system 116 to generate a feature 164 requested by a call 158 from a computing program 156. The method 500 may be executed by the processor 118, memory 120, and network interface 122 of the FQL system 116. The method 500 may begin at step 502 where the call 158 is received. As described above with respect to FIGS. 1 and 2, the call 158 includes a request 202b in a programming language of the computing program 156 for a feature 164 of stored videos 134 and/or a provided image/video 114. At step 504, an image/video 114 may be received. For example, if the request 202b is for a description of the image/video 114 (e.g., of persons appearing in the image/video 114, of a comparison of the image/video 114 to stored videos 134, etc.), then the image/video 114 is also provided. At step 506, a list 308 may be received by the FQL system 116. For example, a list 308 may be provided along with a call 158 with a request 202b of whether the individuals in the list 308 appear in the image/video 114. As an example, the list 308 may identify expected attendees at an event that was recorded by the image/video 114.

At step 508, a command 210 is determined that is associated with obtaining the feature 164 requested by the call 158 (e.g., by the request 202b of FIG. 2). The determined command 210 corresponds to an image analysis to perform on at least a portion of the stored videos 134 and/or the image/video 114 from step 504 (if received) in order to determine the feature 164 requested by the call 158. Examples of the determination of a command 210 is described in greater detail above with respect to the optimizer 208 of FIG. 2.

At step 510, an artificial intelligence model 216 is determined (e.g., from the set of available artificial intelligence models 130) to execute on at least a portion of the stored videos 134 and/or the received image/video 114. The selected artificial intelligence model 216 is determined based at least in part on the determined command 210 from step 508. For example, if a person search command 210 is determined at step 508, then a person search model 130 may be selected at step 510. As another example, if a multiple-person search command 210 is determined at step 508, then a multiple-person detection model 130 may be selected at step 510. Other examples of selecting an appropriate artificial intelligence model 130 are described with respect to the model selector 214 of FIG. 2 above.

At step 512, the selected artificial intelligence model 216 is executed by applying the model 216 to at least a portion of the stored videos 134 and/or the received image/video 114. For example model output(s) 218a,b may be determined as described above with respect to FIG. 2. At step 514, a feature 164 is determined based at least in part on the model output(s) 218a,b from step 512. For example, a portion of the model output(s) 218a,b may be selected to include in the feature 164 and/or an appropriate yes/no indication 228 may be determined using information from the model output(s) 218a,b (see, e.g., FIGS. 2 and 3). At step 516, the feature 164 from step 514 is transmitted (e.g., by the network interface 122 of the FQL system 116) for use by the computing program 156. The feature 164 may be in a programming language used by the computing program 156. The computing program 156 may use the feature 164 to perform programmatic functions based on properties of media, such as the videos 134 stored in the media repository 132 and the image/video 114. For example, the computing program 156 may identify attendees at an event recorded by a video 134 and/or an image/video 114 and automatically determine attendance information, request payment for attendance, provide payment for attendance, and the like (see, e.g., FIG. 3 and corresponding description above). Such media-based programmatic operations were not possible using previous technology.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
   a user device comprising a processor configured to transmit a natural language query provided by a user, wherein the natural language query comprises a request for a description of videos stored in a media repository, wherein the request for the description of the videos stored in the media repository comprises a request for an indication of who appears in a received video; and
   a query system comprising:
      a network interface configured to receive the natural language query; and
      a processor communicatively coupled to the network interface and configured to:
         determine a command associated with obtaining the description of the videos stored in the media repository requested by the natural language query, wherein the determined command corresponds to an image analysis to perform on at least a portion of the stored videos in order to determine the requested description of the videos stored in the media repository, wherein the determined command comprises a face identification command;
         determine, based at least in part on the determined command, an artificial intelligence model to execute on at least the portion of the stored videos, wherein the determined artificial intelligence model comprises a face identification model;
         determine, by executing the determined artificial intelligence model, a model output comprising the requested description of the videos stored in the media repository by:
            applying the face identification model to the received video, thereby determining a first set of identities corresponding to faces appearing in the received video;
            applying the face identification model to the stored videos, thereby determining a second set of identities corresponding to faces appearing in the stored videos; and
            determining a third set of identities that appear in both the first set of identities and the second set of identities; and
         provide a response to the natural language query, the response comprising the requested description of the videos stored in the media repository, wherein the response comprises the third set of identities.

2. The system of claim 1, wherein:
   the request for the description of the videos stored in the media repository comprises a request for an indication of whether a person appears in the videos stored in the media repository; and
   the processor is further configured to:
      determine the command as a person search command;
      determine the artificial intelligence model as a person detection model;
      apply the person detection model to the stored videos, thereby determining the model output indicating whether the person appears in the stored videos;
      if the model output indicates that the person appears in the stored videos, provide the response comprising a natural language indication that the person appears in the stored videos; and
      if the model output indicates that the person does not appear in the stored videos, provide the response comprising a natural language indication that the person does not appear in the stored videos.

3. The system of claim 1, wherein:
   the request for the description of the videos stored in the media repository comprises a request for an indication of whether two people appear together in the stored videos; and
   the processor is further configured to:
      determine the command as a multiple-person search command;
      determine the artificial intelligence model as a multiple-person detection model;
      apply the multiple-person detection model to the stored videos, thereby determining the model output indicating whether the two people appear together in the stored videos;
      if the model output indicates that the two people appear together in the stored videos, provide the response comprising an indication that the two people appear together in the stored videos; and
      if the model output indicates that the two people do not appear together in the stored videos, provide the response comprising a natural language indication that the two people do not appear together in the stored videos.

4. The system of claim 1, wherein:
   the request for the description of the videos stored in the media repository comprises a request for an indication of who appears in the stored videos; and
   the processor is further configured to:
      determine the command as a face identification command;
      determine the artificial intelligence model as a face identification model;
      apply the face identification model to the stored videos, thereby determining identities corresponding to faces identified in the stored videos; and provide the response comprising the determined identities.

5. The system of claim 1, wherein:
the network interface is further configured to receive an image associated with the natural language query;
the request for the description of the videos stored in the media repository comprises a request for an indication of whether the stored videos include a video of a person appearing in the received image; and
the processor is further configured to:
determine the command as a face identification command;
determine the artificial intelligence model as a face identification model;
apply the face identification model to the received image, thereby determining a first set of identities corresponding to faces appearing in the received image;
apply the face identification model to the stored videos, thereby determining a second set of identities corresponding to faces appearing in the stored videos;
determine whether at least one identity appears in both the first set of identities and the second set of identities;
if at least one identity appears in both the first set of identities and the second set of identities, provide the response comprising an indication that the stored videos include the video of the person; and
if at least one identity does not appear in both the first set of identities and the second set of identities, provide the response comprising an indication that the stored videos do not include the video of the person.

6. The system of claim 1, wherein the processor is further configured to:
determine that the received request was previously processed and that previous results are stored for the received request; and
provide the response comprising the previous results.

7. A method, comprising:
storing a media repository comprising videos;
receiving a natural language query comprising a request for a description of videos stored in a media repository, wherein the request for the description of the videos stored in the media repository comprises a request for an indication of who appears in a received video;
determining a command associated with obtaining the description of the videos stored in the media repository requested by the natural language query, wherein the determined command corresponds to an image analysis to perform on at least a portion of the stored videos in order to determine the requested description of the videos stored in the media repository, wherein the determined command comprises a face identification command;
determining, based at least in part on the determined command, an artificial intelligence model to execute on at least the portion of the stored videos, wherein the determined artificial intelligence model comprises a face identification model;
determining, by executing the determined artificial intelligence model, a model output comprising the requested description of the videos stored in the media repository by:
applying the face identification model to the received video, thereby determining a first set of identities corresponding to faces appearing in the received video;
applying the face identification model to the stored videos, thereby determining a second set of identities corresponding to faces appearing in the stored videos; and
determining a third set of identities that appear in both the first set of identities and the second set of identities; and
providing a response to the natural language query, the response comprising the requested description of the videos stored in the media repository, wherein the response comprises the third set of identities.

8. The method of claim 7, wherein:
the request for the description of the videos stored in the media repository comprises a request for an indication of whether a person appears in the videos stored in the media repository; and
the method further comprises:
determining the command as a person search command;
determining the artificial intelligence model as a person detection model;
applying the person detection model to the stored videos, thereby determining the model output indicating whether the person appears in the stored videos;
if the model output indicates that the person appears in the stored videos, providing the response comprising a natural language indication that the person appears in the stored videos; and
if the model output indicates that the person does not appear in the stored videos, providing the response comprising a natural language indication that the person does not appear in the stored videos.

9. The method of claim 7, wherein:
the request for the description of the videos stored in the media repository comprises a request for an indication of whether two people appear together in the stored videos; and
the method further comprises:
determine the command as a multiple-person search command;
determine the artificial intelligence model as a multiple-person detection model;
apply the multiple-person detection model to the stored videos, thereby determining the model output indicating whether the two people appear together in the stored videos;
if the model output indicates that the two people appear together in the stored videos, provide the response comprising an indication that the two people appear together in the stored videos; and
if the model output indicates that the two people do not appear together in the stored videos, provide the response comprising a natural language indication that the two people do not appear together in the stored videos.

10. The method of claim 7, wherein:
the request for the description of the videos stored in the media repository comprises a request for an indication of who appears in the stored videos; and
the method further comprises:
determining the command as a face identification command;

determining the artificial intelligence model as a face identification model;
applying the face identification model to the stored videos, thereby determining identities corresponding to faces identified in the stored videos; and
providing the response comprising the determined identities.

11. The method of claim 7, wherein:
the request for the description of the videos stored in the media repository comprises a request for an indication of whether the stored videos include a video of a person appearing in a received image; and
the method further comprises:
receiving the image;
determining the command as a face identification command;
determining the artificial intelligence model as a face identification model;
applying the face identification model to the received image, thereby determining a first set of identities corresponding to faces appearing in the received image;
applying the face identification model to the stored videos, thereby determining a second set of identities corresponding to faces appearing in the stored videos;
determining whether at least one identity appears in both the first set of identities and the second set of identities;
if at least one identity appears in both the first set of identities and the second set of identities, providing the response comprising an indication that the stored videos include the video of the person;
if at least one identity does not appear in both the first set of identities and the second set of identities, providing the response comprising an indication that the stored videos do not include the video of the person.

12. The method of claim 7, further comprising:
determining that the received request was previously processed and that previous results are stored for the received request; and
providing the response comprising the previous results.

13. A system, comprising:
a memory operable to store a media repository configured to store videos;
a network interface configured to receive a natural language query comprising a request for a description of videos stored in a media repository, wherein the request for the description of the videos stored in the media repository comprises a request for an indication of who appears in a received video; and
a processor communicatively coupled to the memory and the network interface and configured to:
determine a command associated with obtaining the description of the videos stored in the media repository requested by the natural language query, wherein the determined command corresponds to an image analysis to perform on at least a portion of the stored videos in order to determine the requested description of the videos stored in the media repository, wherein the determined command comprises a face identification command;
determine, based at least in part on the determined command, an artificial intelligence model to execute on at least the portion of the stored videos, wherein the determined artificial intelligence model comprises a face identification model;
determine, by executing the determined artificial intelligence model, a model output comprising the requested description of the videos stored in the media repository by:
applying the face identification model to the received video, thereby determining a first set of identities corresponding to faces appearing in the received video;
applying the face identification model to the stored videos, thereby determining a second set of identities corresponding to faces appearing in the stored videos; and
determining a third set of identities that appear in both the first set of identities and the second set of identities; and
provide a response to the natural language query, the response comprising the requested description of the videos stored in the media repository, wherein the response comprises the third set of identities.

14. The system of claim 13, wherein:
the request for the description of the videos stored in the media repository comprises a request for an indication of whether a person appears in the videos stored in the media repository; and
the processor is further configured to:
determine the command as a person search command;
determine the artificial intelligence model as a person detection model;
apply the person detection model to the stored videos, thereby determining the model output indicating whether the person appears in the stored videos;
if the model output indicates that the person appears in the stored videos, provide the response comprising a natural language indication that the person appears in the stored videos; and
if the model output indicates that the person does not appear in the stored videos, provide the response comprising a natural language indication that the person does not appear in the stored videos.

15. The system of claim 13, wherein:
the request for the description of the videos stored in the media repository comprises a request for an indication of whether two people appear together in the stored videos; and
the processor is further configured to:
determine the command as a multiple-person search command;
determine the artificial intelligence model as a multiple-person detection model;
apply the multiple-person detection model to the stored videos, thereby determining the model output indicating whether the two people appear together in the stored videos;
if the model output indicates that the two people appear together in the stored videos, provide the response comprising an indication that the two people appear together in the stored videos; and
if the model output indicates that the two people do not appear together in the stored videos, provide the response comprising a natural language indication that the two people do not appear together in the stored videos.

16. The system of claim 13, wherein:
the request for the description of the videos stored in the media repository comprises a request for an indication of who appears in the stored videos; and
the processor is further configured to:
  determine the command as a face identification command;
  determine the artificial intelligence model as a face identification model;
  apply the face identification model to the stored videos, thereby determining identities corresponding to faces identified in the stored videos; and
  provide the response comprising the determined identities.

17. The system of claim 13, wherein:
the network interface is further configured to receive an image associated with the natural language query;
the request for the description of the videos stored in the media repository comprises a request for an indication of whether the stored videos include a video of a person appearing in the received image; and
the processor is further configured to:
  determine the command as a face identification command;
  determine the artificial intelligence model as a face identification model;
  apply the face identification model to the received image, thereby determining a first set of identities corresponding to faces appearing in the received image;
  apply the face identification model to the stored videos, thereby determining a second set of identities corresponding to faces appearing in the stored videos;
  determine whether at least one identity appears in both the first set of identities and the second set of identities;
  if at least one identity appears in both the first set of identities and the second set of identities, provide the response comprising an indication that the stored videos include the video of the person; and
  if at least one identity does not appear in both the first set of identities and the second set of identities, provide the response comprising an indication that the stored videos do not include the video of the person.

\* \* \* \* \*